C. B. PETTENGILL.

SAD-IRON HOLDER.

No. 7,392. Reissued Nov. 14, 1876.

Witnesses;
Jewels Shaw,
H. E. Metcalf,

Inventor;
Charles B. Pettengill,
Per C. C. Shaw
Atty.

N. PETERS, PHOTO-LITHOGRAPHER, WASHINGTON, D. C.

UNITED STATES PATENT OFFICE.

CHARLES B. PETTENGILL, OF EASTON, MASSACHUSETTS.

IMPROVEMENT IN SAD-IRON HOLDERS.

Specification forming part of Letters Patent No. 139,733, dated June 10, 1873; reissue No. 7,392, dated November 14, 1876; application filed July 1, 1876.

*To all whom it may concern:*

Be it known that I, CHARLES B. PETTENGILL, formerly of Hebron, State of Maine, now of Easton, in the county of Bristol, State of Massachusetts, have invented a certain new and useful Improvement in Kitchen Implements, of which the following is a description sufficiently full, clear, and exact to enable any person skilled in the art or science to which my invention appertains to make and use the same, reference being had to the accompanying drawing, forming a part of this specification, in which—

Figure 1:
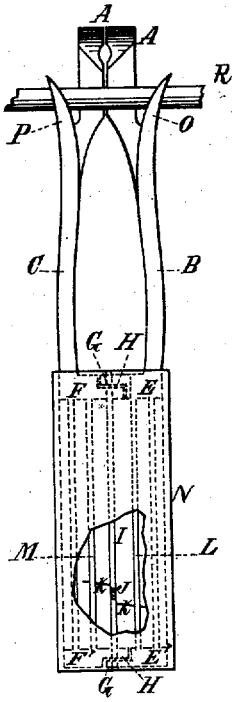
Figure 2:
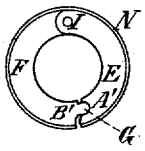

Figure 1 is a top view or plan, with a part of the handle-covering represented as broken away to show the interior mechanism; and Fig. 2, an end view.

Like letters of reference indicate corresponding parts in the different figures of the drawing.

My invention relates to that class of implements which are designed for general use in the kitchen in such work as holding sad-irons, lifting griddles, covers, kettles, plates, &c.; and consists in a novel construction and arrangement of the parts, as hereinafter more fully set forth.

The nature and operation of my invention will be readily understood by all conversant with such matters from the following description.

In the drawing, E E′ F F′ represent the end pieces of the handle. These pieces are rabbeted or halved, as seen at G H, and hinged or jointed together by means of the rod I. The piece E is connected to the piece E′ by a series of rods or bars, L, and the piece F is, in like manner, connected to the piece F′ by a series of rods or bars, M. These rods and end pieces form the frame-work of the handle, which is in two principal sections, and may be composed of any suitable material, being covered with the cloth or leather covering N, to protect the hand from heat.

A spiral spring, J, is coiled about the rod I, its free ends K K being arranged beneath the rods L M in such a manner that the torsional or expansive action of the spring will tend constantly to open the handle upon its central joints. This spring, however, may be omitted, if desired, the hand overlapping the handle of the implement in such a manner as to readily manipulate it without the aid of the spring.

Projecting from the pieces E F are two arms, B C, which are provided with the prongs O P, and elongated to form the cover or griddle lift A A, their shape at this portion being such as to fit the aperture or recess usually found in griddles, stove-covers, &c. The prongs O P branch off from the arms B C laterally, and their points are also elevated above the plane of the arms when the implement is in the position shown in Fig. 1. The arms B C are slightly curved to bring the parts A A nearly together when the implement is closed, and are preferably cast integral with the respective portions of the frame-work of the handle to which they are attached.

In the use of my improved implement as a sad-iron holder the handle of the iron is inserted between the expanded sections of the handle of the implement, which is then closed around the sad-iron handle.

For lifting kettles, plates, basins, bowls, &c., the bail or edge of the article to be raised is inserted beneath the prongs O P, as seen at R in Fig. 1. The handle is then compressed, causing the prongs to partially rotate around a center of motion coincident with a line drawn longitudinally through the rod I, grasping and holding the article by cramping it between the elongated portions A A and the prongs. The parts A A close laterally with a semi-rotary motion as the handle is compressed, and may be employed advantageously in grasping and raising articles of small size.

The covering N not only protects the hand from the effects of the heat, but prevents it from injury by getting caught or pinched in the joints of the handle, and also adds to the neat appearance of the article.

The adaptation of the implement to a variety of other and similar uses will be obvious, without a more elaborate description.

What I claim is—

1. In an implement substantially such as described, the piece E, connected to the piece E′ by the bars L, and provided with the arm B, forming one half or section of the implement, and the piece F, connected to the piece F′ by the bars M, and provided with the arm C, forming the other half or section, the two sections being hinged or jointed together, substantially as set forth and specified.

2. In an implement substantially such as described, the arms B C, provided with the prongs O P, constructed and arranged to operate substantially as specified.

3. In an implement substantially such as described, the covering N, in combination with the hinged sections forming the handle thereof, substantially as set forth and specified.

CHARLES B. PETTENGILL.

Witnesses:
C. A. SHAW,
LEWIS LEMON.